F. K. CRUMB.
STOOL.
APPLICATION FILED MAY 23, 1906.
938,219.
Patented Oct. 26, 1909.
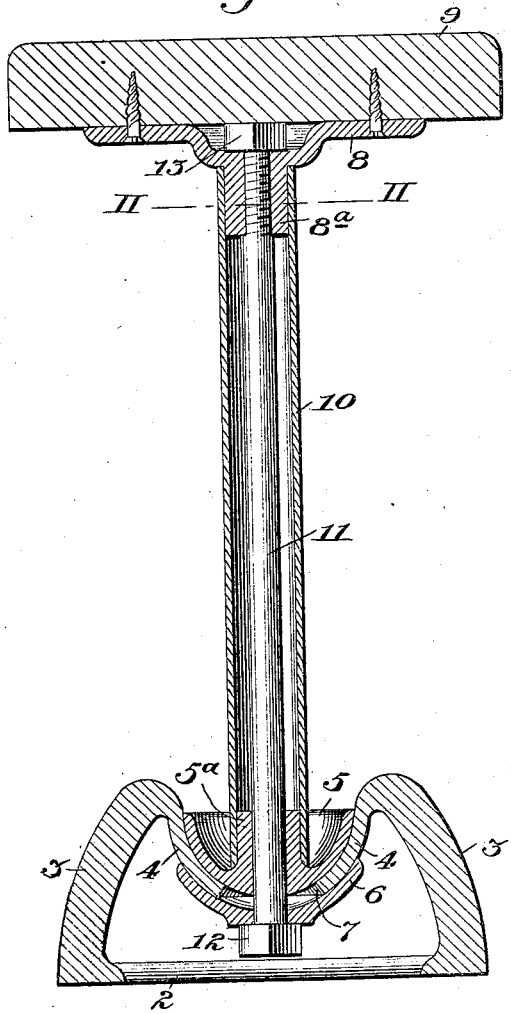
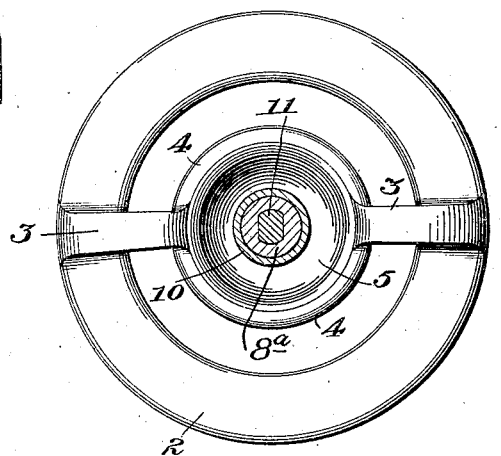
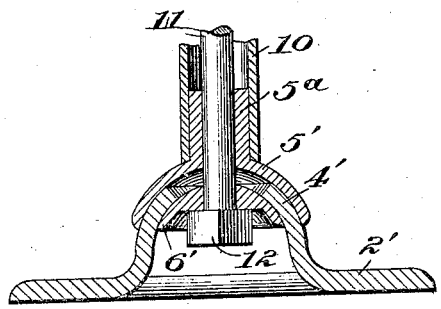
Witnesses:
Inventor:
Frank K. Crumb
by W. B. Corwin
Att'y.

UNITED STATES PATENT OFFICE.

FRANK K. CRUMB, OF NIOBE, NEW YORK.

STOOL.

938,219.

Specification of Letters Patent.　Patented Oct. 26, 1909.

Application filed May 23, 1906. Serial No. 318,315.

*To all whom it may concern:*

Be it known that I, FRANK K. CRUMB, of Niobe, in the county of Chautauqua and State of New York, have invented a new and useful Improvement in Stools; and I hereby declare the following to be a full, clear, and exact description of the same.

My invention consists in an improved stool, particularly adapted to be used for milking purposes, and the object of the same is to provide a simple and durable stool which within certain prescribed limits will follow automatically the movements of the occupant.

I will now describe my invention so that others skilled in the art may manufacture and use the same, reference being had to the accompanying drawing, forming part of this specification, in which—

Figure 1 is a vertical central section of my improved stool. Fig. 2 is a horizontal cross-section on the line II—II of Fig. 1. Fig. 3 is a view (broken away) similar to Fig. 1 of a modified form of the invention.

Like symbols of reference indicate like parts in each figure.

In the drawing, the supporting stand of the stool consists of the base 2 having standards 3 rising therefrom at opposite sides for the purpose of upholding the concave substantially hemi-spherical cup-shaped portion 4, designed to receive the substantially hemi-spherical cup-bearing 5 which is outwardly convex and concentric with and adapted to fit and move within the portion 4 after the manner of an universal joint.

6 is a substantially hemi-spherical concave washer concentric with and adapted to fit against the under side of the part 4.

8 is the support for the seat 9 of the stool, the two parts being suitably connected together by screws or other fastening devices.

10 is a hollow standard or pipe which forms the main support for sustaining the weight of the occupant of the stool, the cup 5 and the seat-support 8 having extensions 5ª and 8ª, respectively, projecting into the lower and upper ends of the standard 10. The several parts are united by a bolt 11, having a head 12 fitting against the under surface of the washer 6, and a nut 13 seated in a concavity of and bearing against the upper surface of the seat-support. As will be observed, the sides of the bolt 11 are flattened at its upper end and fitted within a similarly-shaped opening in the extension 8ª to prevent the bolt from withdrawing from the nut after the latter has been tightened. By means of the nut 13, the parts are firmly fastened together but not so rigidly as to prevent movement of the cup 5 and washer 6 relatively to the portion 4 which they embrace, the portion 4 having a substantially circular opening 7 to permit movement of the bolt during such described movement of the parts 5 and 6. Instead of employing the nut 13, the end of the bolt may be riveted against the top of the seat-support; or both ends of the bolt may be provided with rivet heads.

In Fig. 3 a modified form of my invention is shown. In this form of the invention, the base 2' has an upwardly-extending substantially hemi-spherical dome-shaped portion 4', over and within which fit respectively the substantially hemi-spherical concave cup 5' and substantially hemi-spherical convex washer 6', the dome 4' being provided with an opening 7 in its top for the same purpose as the opening 7 in the form shown in Fig. 1. The remaining parts of the stool are the same and are held together in the same manner as in Fig. 1.

By the use of the words "stationary base" in the claims I do not mean that the base is fixed to its support but merely that it is stationary with relation to the same when the stool is in an operative position.

The advantages of my invention will be apparent. The device is simple, durable, and inexpensive in construction, and the parts are so connected and so work together that they cannot accidentally become separated or disconnected without actual breakage.

I claim:—

1. In a seat, a stationary hollow base member having substantially hemi-spherical concentric concave and convex bearing surfaces, a standard having a seat-support at its upper end and carrying at its lower end substantially hemi-spherical bearings concentric with and fitting against said concave and convex bearing surfaces of the base member, and a bolt connecting said seat-support to said base member, the bearing surfaces of the base member fitting between said upper and lower bearing surfaces of the standard and being provided with an extended substantially circular opening to permit movement of the bolt during movement of said standard bearing surfaces relatively to the stationary base bearing surfaces.

2. In a seat, a stationary hollow base member having substantially hemi-spherical concentric concave and convex bearing surfaces, and a standard having a seat-support at its upper end and carrying at its lower end a substantially hemi-spherical cup concentric with and fitting against the upper one of said bearing surfaces, and a connecting bolt carrying at its lower end a substantially hemi-spherical bearing concentric with and fitting against the lower one of the bearing surfaces of the base member; said bearing surfaces being provided with an extended substantially circular opening to permit movement of the bolt during movement of said cup and bolt-bearing relatively to said stationary base bearing surfaces, substantially as described.

3. In a seat, a base member having substantially hemi-spherical concentric concave and convex bearing surfaces, a hollow standard having a seat-support at its upper end and a substantially hemi-spherical cup at its lower end concentric with and fitting against the upper one of said bearing surfaces, a washer having a substantially hemi-spherical bearing surface concentric with and fitting against the lower one of said bearing surfaces of the base member, and a bolt connecting said washer and seat-support; the said bearing surfaces of the base member being provided with an extended opening to permit movement of the bolt during movement of said cup and washer relatively to said bearing surfaces of the base member, substantially as described.

4. In a seat, a base having a rounded convex bearing surface on its upper side and a rounded concave bearing surface on its under side, a hollow standard having a seat-support at its upper end and a concave bearing at its lower end concentric with and fitting against said convex bearing surface, a washer having a convex bearing surface concentric with and fitting against the concave bearing surface of the base member, and a bolt connecting said washer and seat-support; the said bearing surfaces of the base being provided with an extended opening to permit movement of the bolt during movement of the standard bearing and washer relatively to said bearing surfaces of the base member, substantially as described.

In testimony whereof, I have hereunto set my hand.

FRANK K. CRUMB.

Witnesses:
   E. A ARNOLD,
   F. A. ARNOLD.